Patented Aug. 7, 1945

2,381,001

UNITED STATES PATENT OFFICE 2,381,001

METHOD OF PREPARING TETRACHLOROETHYLENE AND CHLOROSILANES

Winton I. Patnode, Schenectady, N. Y., and Robert W. Schiessler, State College, Pa., assignors to General Electric Company, a corporation of New York No Drawing. Application March 4, 1942, Serial No. 433,329

8 Claims. (Cl. 260—607)

This invention relates to a method of preparing tetrachloroethylene and chlorosilanes. It is particularly concerned with, and has as its principal object, the preparation of these compounds by effecting reaction between carbon tetrachloride and silicon in the presence of a metallic catalyst for the reaction.

The present invention is based on our discovery that carbon tetrachloride in the vapor state reacts vigorously and exothermically with silicon in the presence of a metallic catalyst at temperatures above 80° C. to form a reaction product composed primarily of tetrachloroethylene and, as a secondary product of the reaction, hexachlorodisilane, along with other higher or lower boiling materials including silicon tetrachloride.

The silicon employed in the practice of this invention may be used as such in the presence of, or intimately associated with, the metallic catalyst, or, it may be used in the form of an alloy with the catalytic metal or metals. Preferably, solid porous contact masses or alloys composed of silicon and a metallic catalyst are employed. Such masses are described and claimed in the copending application of Winton I. Patnode, Serial No. 412,461, filed September 26, 1941, and assigned to the same assignee as the present invention. Copper is the preferred metallic catalyst used to accelerate or control the reaction between the silicon and the carbon tetrachloride. Other catalytic metals which may be used are nickel, tin, antimony, manganese, silver, and titanium.

In order to initiate the desired reaction between the silicon and the carbon tetrachloride, the temperature should be at least 80° C. but should not be so high as to cause excessive deposition of carbon on the unreacted silicon during the reaction. The best yields of reaction products boiling above 100° C. are obtained when the reaction temperature is maintained at about 200–210° C. Higher reaction temperatures, up to 300° C., can be employed but increased carbonization at the more elevated temperatures may necessitate frequent renewal of the silicon reactant.

Preferably the reaction between the carbon tetrachloride and silicon is carried out in the presence of an inert, gaseous diluent such as nitrogen. The inert gas may be mixed with the carbon tetrachloride vapors as they enter the reaction vessel or the inert gas may be passed through a carbon tetrachloride reservoir and thus serve as a carrier for the reactant vapors. Larger yields of the desired products and better control of the reaction is possible when the inert gas comprises at least 50 per cent of the gaseous mixture entering the reaction vessel. Other advantages resulting from the general use of such inert gases in carrying out vapor phase reactions between halogenated hydrocarbons and silicon are more fully set forth in the copending application of M. M. Sprung and W. F. Gilliam, Serial No. 433,293, filed concurrently herewith and assigned to the same assignee as the present invention.

In order that those skilled in the art better may understand how the present invention may be carried into effect the following example is given to illustrate our preferred method of effecting the reaction between the silicon and carbon tetrachloride:

*Example.*—Dry, oxygen-free nitrogen gas was bubbled through a reservoir of carbon tetrachloride at the rate of about 300 c. c. per minute and was then passed into a reaction tube packed with pellets of a silicon-copper alloy containing 90 per cent silicon and 10 per cent copper. These contact masses and their preparation are described and claimed in the Patnode application Serial No. 412,461 referred to hereinbefore. By maintaining the temperature of the carbon tetrachloride at approximately 25–27° C., the carbon tetrachloride vapor was carried into the reaction tube at a rate corresponding to from 0.4 to 0.5 gram thereof per minute. The reaction tube and its contents were maintained at a temperature of from 200 to 210° C. The reaction products issuing from the tube were condensed in a collection flask maintained at a temperature of the order of 0° to 20° C. The condensate was distilled to remove unreacted carbon tetrachloride and the high-boiling residue, i. e., the portion of the condensate boiling above 100° C., was subjected to careful fractionation. It was found to contain about 30 per cent by weight of a liquid boiling at about 117–118° C. which was identified by its boiling point and its dibromo-derivative, sym. tetrachlorodibromoethane, as being tetrachloroethylene, $Cl_2C{=}CCl_2$. The next higher-boiling fraction having a boiling range between 140° and 142° C. was a chlorinated silicon compound identified as hexachlorosilane, $Cl_3Si-SiCl_3$. The composition of residue remaining after the separation of these compounds was not positively determined. Fractionation thereof at a 52 mm. pressure resulted in the clogging of the condenser by a white, crystalline solid which reacted with water to give off hydrogen chloride.

The rate at which the carbon tetrachloride may be passed into the reaction tube or vessel depends on the size and temperature of the tube and the rate of dissipation of the heat of reaction. The rate of flow should be determined by trial in each case. When the carbon tetrachloride vapor is carried into the tube by the nitrogen bubbled through a reservoir of liquid carbon tetrachloride, the rate of introduction thereof can be controlled by the reservoir temperature and/or the rate of flow of nitrogen while the relative proportions of the inert gas and the reactant gas in the mixture entering the tube may be controlled by varying the reservoir temperature.

What we claim as new and desire to secure by Letters Patent of the United States is:

1. The method which comprises effecting reaction between heated silicon and carbon tetrachloride in the presence of a metallic catalyst for the reaction.

2. The method which comprises effecting reaction between carbon tetrachloride in vapor form and heated silicon in the presence of an inert gas and a metallic catalyst for the reaction.

3. The method which comprises effecting reaction between carbon tetrachloride and the silicon component of a heated, solid, porous mass of powdered silicon and a metallic catalyst in the presence of nitrogen.

4. The method which comprises effecting reaction between carbon tetrachloride and silicon at a temperature between 80° and 300° C. in the presence of a copper catalyst for the reaction.

5. The method which comprises effecting reaction between carbon tetrachloride component of a gaseous mixture of nitrogen and carbon tetrachloride and the silicon component of a solid, porous mixture of silicon and copper maintained at a temperature of from 80°–300° C.

6. The method of preparing tetrachloroethylene from carbon tetrachloride which comprises bringing the carbon tetrachloride in the vapor phase into contact with a mixture of silicon and copper at a temperature between 80° and 300° C.

7. The method of preparing tetrachloroethylene which comprises effecting reaction between carbon tetrachloride component of a gaseous mixture of nitrogen and carbon tetrachloride and the silicon component of a solid, porous mass of silicon and copper at a temperature between 80° and 300° C. and recovering the tetrachloroethylene from the reaction products.

8. The method which comprises effecting reaction between the carbon tetrachloride component of a mixture of carbon tetrachloride and nitrogen and the silicon component of a mixture of silicon and copper at a temperature of about 200°–210° C.

WINTON I. PATNODE.
ROBERT W. SCHIESSLER.